Figure 1:
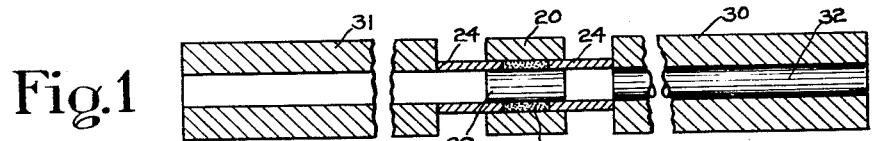

Dec. 26, 1950 G. R. WATSON 2,535,180
METHOD OF MOLDING HOLLOW ARTICLES FROM REFRACTORY
MATERIALS UNDER HEAT AND PRESSURE
Filed Feb. 5, 1947 3 Sheets-Sheet 1

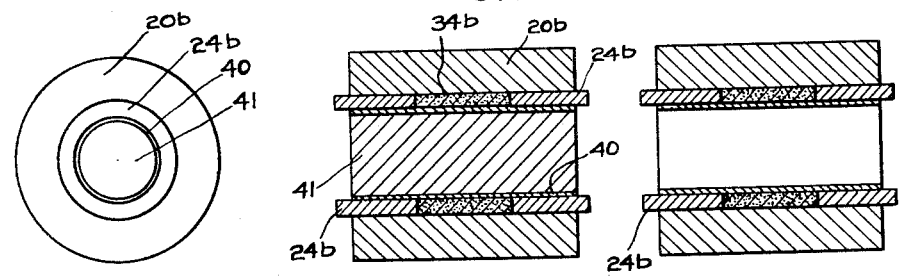
Fig. 7    Fig. 5    Fig. 6
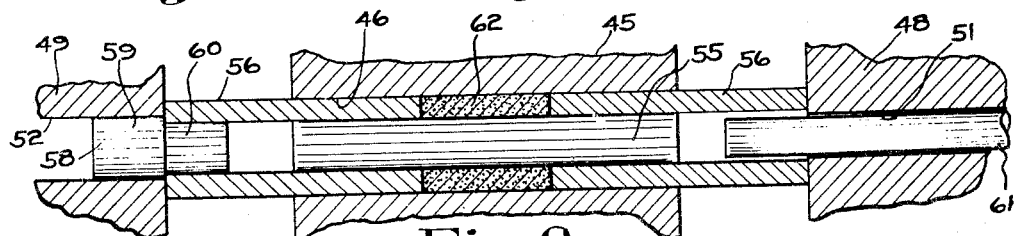
Fig. 8
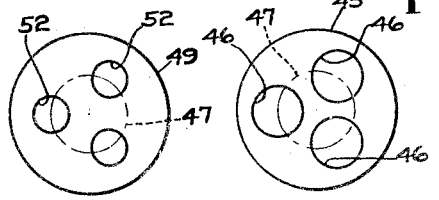
Fig.11  Fig.10  Fig. 9
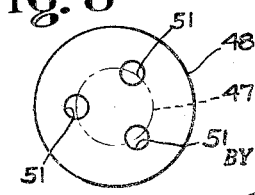
INVENTOR.
GEORGE R. WATSON
BY
*George C. Crompton*
ATTORNEY

INVENTOR.
GEORGE R. WATSON
BY
ATTORNEY

Dec. 26, 1950     G. R. WATSON     2,535,180
METHOD OF MOLDING HOLLOW ARTICLES FROM REFRACTORY
MATERIALS UNDER HEAT AND PRESSURE

Filed Feb. 5, 1947     3 Sheets-Sheet 3

INVENTOR
GEORGE R. WATSON
BY George Crompton Jr.
ATTORNEY

Patented Dec. 26, 1950

2,535,180

UNITED STATES PATENT OFFICE 2,535,180

METHOD OF MOLDING HOLLOW ARTICLES FROM REFRACTORY MATERIALS UNDER HEAT AND PRESSURE

George R. Watson, Chippawa, Ontario, Canada, assignor, by mesne assignments, to the United States of America as represented by the United States Atomic Energy Commission Application February 5, 1947, Serial No. 726,469

5 Claims. (Cl. 25—156)

The invention relates to a method of molding hollow refractory materials under heat and pressure.

One object of the invention is to mold thin walled hollow pieces of refractory material under heat and pressure. Another object is successfully to mold hollow pieces of refractory material which has a coefficient of expansion materially higher than graphite. Another object is successfully to mold hollow pieces of refractory material which has a tendency to stick to graphite.

Another object of the invention is to increase production and to obtain a smaller number of defective pieces in the hot pressure molding of hollow pieces from refractory materials in graphite molds. Another object is to produce better finishes and smoother bores in such molding. Another object is to provide a method of hot pressure molding of hollow pieces made of various oxides such as beryllia, magnesia, alumina, zirconia, titania, calcium oxide, vanadium oxide, strontium oxide, barium oxide and hafnium oxide. Another object is to provide hot pressure molding of hollow pieces made of various other refractory materials such as boron carbide, titanium carbide, titanium nitride, and zirconium carbide.

Another object is to achieve some or all of the above objects in the hot pressure molding a number of pieces in a single operation, using any of the materials mentioned above or others. Another object is to provide a satisfactory method and apparatus for the molding of crucibles out of the materials mentioned and others. Another object is to provide a satisfactory method and apparatus for hot pressure molding out of such materials of hollow pieces having bores which are not cylindrical, such as tapered bores, or non-circular bores, having ribs or other irregularities.

A general object of the invention is to increase the versatility and usefulness of hot pressure molding. Another object is to provide improved equipment and better methods for molding with apparatus constructed along the lines of U. S. Patent to R. R. Ridgway, No. 2,125,588. Another object is to provide improved methods for molding with graphite molds. Another object of the invention is to provide an improved method of molding mixtures of refractory materials to mold which has been a problem.

Other objects will be in part obvious or in part pointed out hereinafter.

The invention accordingly consists in the several steps and relation and order of each of said steps to one or more of the others thereof, all as will be illustratively described herein, and the scope of the application of which will be indicated in the following claims.

Figure 2:
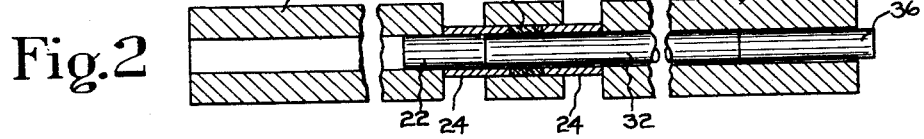
Figure 3:
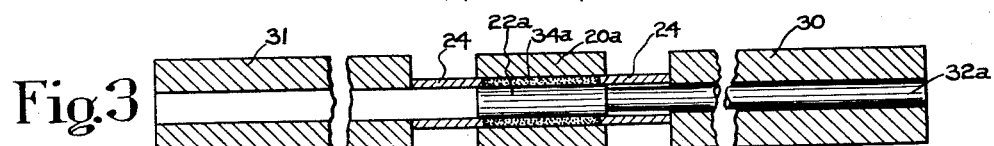
Figure 4:
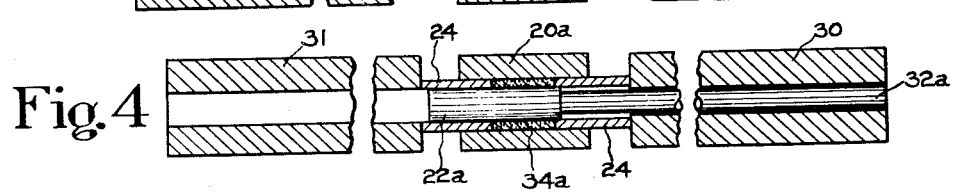
Figure 13:
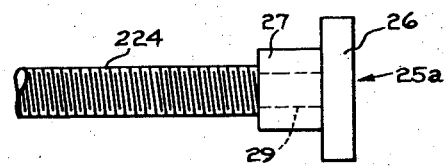
Figure 12:
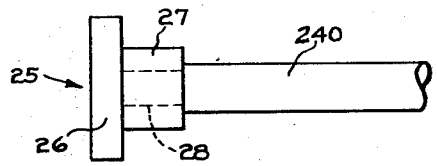
Figure 14:
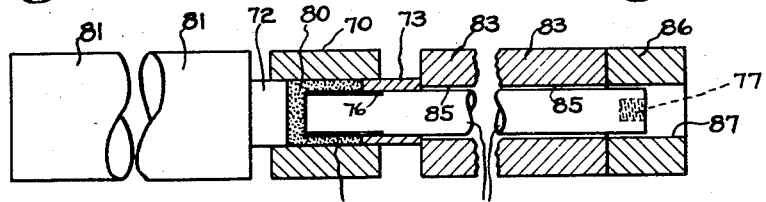
Figure 15:
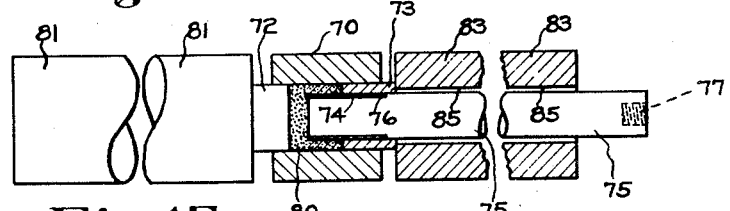
Figure 16:
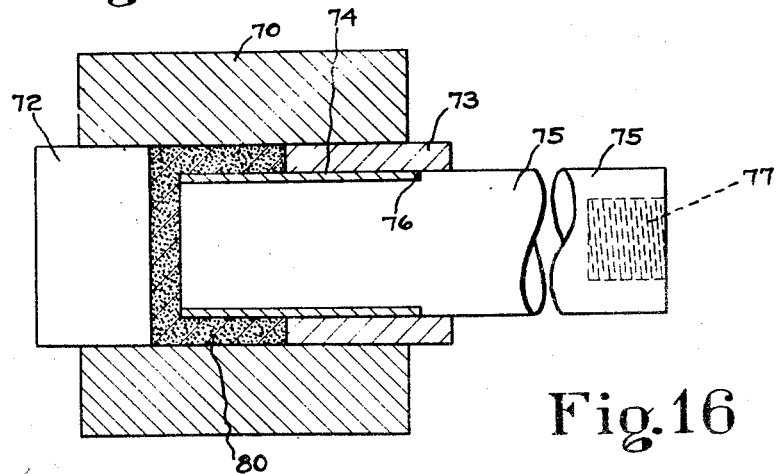
Figure 17:
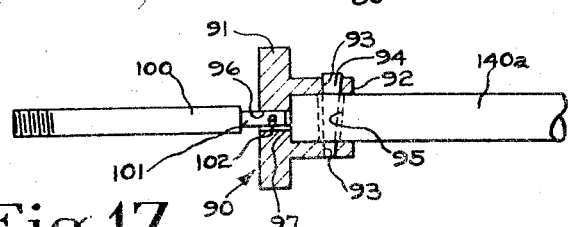

In the accompanying drawings illustrating several applications of the method of this invention, Figure 1 is an axial sectional view of a mold, plungers and core rod which may be used in carrying out the invention, Figure 2 is a view similar to Figure 1 showing a step in the method, Figure 3 is an axial sectional view, to illustrate another embodiment of the invention, Figure 4 is a view similar to Figure 3 showing a step in the method, Figure 5 is an axial sectional view, to illustrate another embodiment of the invention, Figure 6 is a view similar to Figure 5 showing a step in the method, Figure 7 is an end view of the mold assembly of Figures 5 and 6, Figure 8 is a fragmentary axial sectional view of a mold assembly to illustrate how the method may be applied to multiple pressure molding, Figure 9 is an end view of the moveable furnace plunger of Figure 8, on a reduced scale, Figure 10 is an end view of the mold body of Figure 8, on a reduced scale, Figure 11 is an end view of the stationary furnace plunger of Figure 8, on a reduced scale, Figure 12 is a side elevation of a portion of the piston rod 240 of the aforesaid patent to Ridgway No. 2,125,588 with a plain ram head thereon, Figure 13 is a side elevation of a portion of the screw shaft 224 of the aforesaid patent to Ridgway No. 2,125,588 with a plain ram head thereon, Figure 14 is an axial sectional view of a mold, plungers and core rod for molding crucibles according to the invention, Figure 15 is a view similar to Figure 14 showing a step in the method, Figure 16 is a view of the mold, plungers and core rod of Figures 15 and 16, but on an enlarged scale, showing a further step in the method, and showing the crucible completely formed but still in the mold, Figure 17 is an axial sectional view of a special piston rod ram head and connecting link to connect the piston rod to an ejector rod to withdraw the core rod of Figures 14, 15 and 16, Figure 18 is a view partly in axial section and partly in elevation of apparatus according to U. S. patent to Ridway 2,125,588 which can be used in practicing the present invention.

The method of the present invention may be carried out with many types of furnaces equipped with pressure apparatus. For example high frequency induction furnaces may be used. However the most practical and readily available high temperature pressure furnace now known to me is the furnace described in the aforementioned Patent No. 2,125,588 to R. R. Ridgway, and therefore the invention will be described as it is used in conjunction and association with that furnace.

Figure 18:
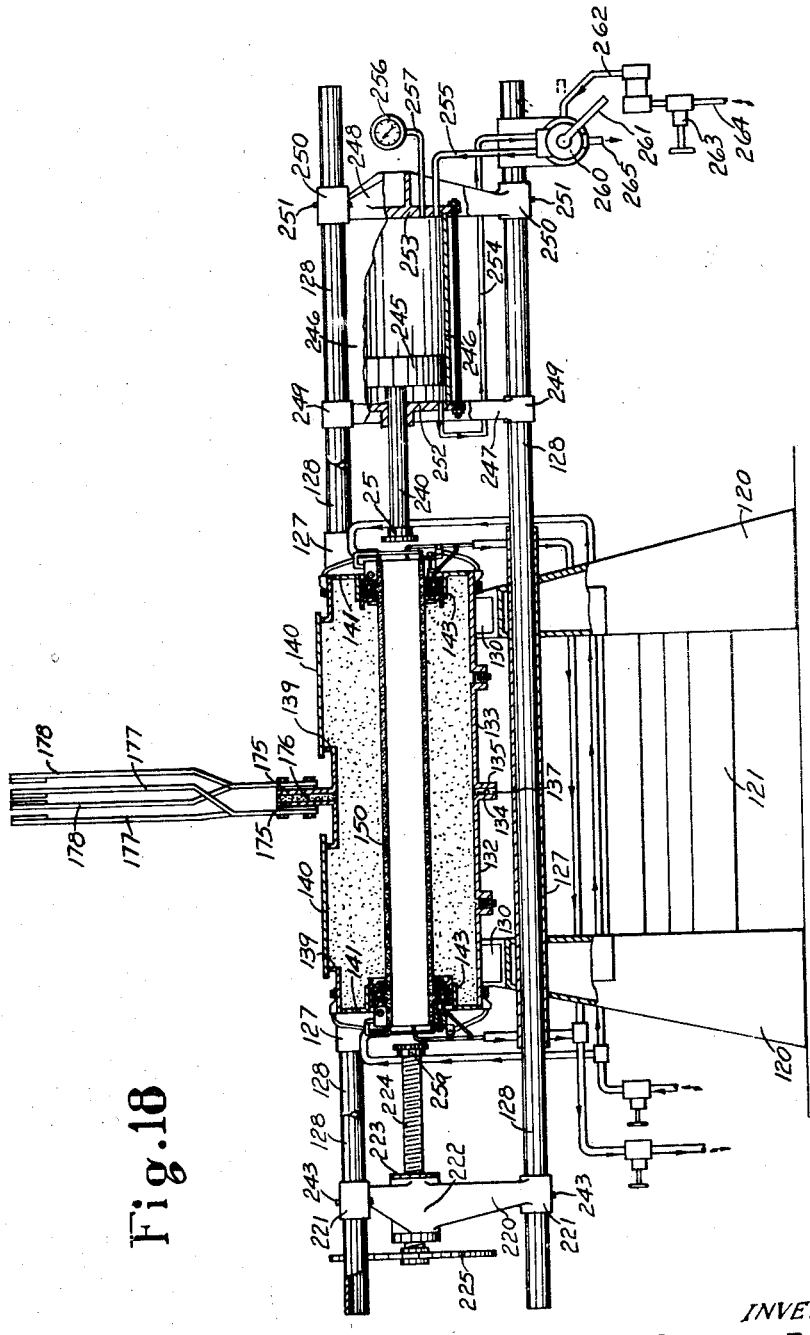

Referring now to Figure 18, the furnace of the aforementioned Ridgway patent has a pair of standards 120—120 which may be similar but oppositely oriented. The standards 120—120 are conected by a longitudinal frame member 121. The standards 120 support tubes 127, preferably three in number in which are slidably mounted tubes 128.

Resting on the standards 120 are chairs 130—130, there being preferably two of these supported by each standard 120. These chairs 130 support aluminum cylinders 132 and 133 having flanges 134 and 135 which are secured together by bolts, not shown. An insulating ring 137 is interposed between the flanges 134 and 135. Each cylinder 132 and 133 has a rectangular portion 139 forming an opening therein and covers 140 normally close these openings.

Closing the otherwise open end of each cylinder are annular end plates 141. These annular plates 141 may be made of aluminum or other suitable material and may be welded to the cylinders 132 and 133 respectively. By the provision of aluminum cylinders partly closed by aluminum end plates there is provided a non-magnetic material surrounding the central heating chamber of the furnace, and at the same time the material is electrically conductive. Through the cylinders 132 and 133 passes a heavy heating current of non-inductive characteristics.

The annular plates 141 have integral cylindrical portions 143 geometrically projected from the inside bounding circles of the plates. The portions 143 constitute supports for the heating resistance element 150 and the supporting electrodes which convey curent thereto. The resistance element 150 is a graphite tube and current flowing by way of the cylinders 132 and 133 flows through this graphite tube 150. The details of the electrodes for the support of the graphite tube 150 and the water cooling thereof will be found fully described in the aforesaid Patent 2,125,588 and need not be repeated herein.

Integral with the flanges 134 and 135 are upwardly extending wings 175 and the insulating ring 137 has a similar upward extension 176. To the wings 175 bus bars 177 and 178 are fastened. The bus bars 177 and 178 are each of them branching bus bars and are of interlaced construction which insures that they shall have low inductive reactance. It will now be seen that current can flow from the bus bars 177 and 178 through the cylinders 132 and 133 and through the graphite tube 150 and that by reason of the geometry of the current path the entire furnace will have low inductive reactance.

There is provided at one end of the furnace movable pressure apparatus and at the other end thereof adjustable apparatus to take the thrust. Referring to the left hand side of Figure 18 the tubes 128 support a spider 220 having parallel bores through three bosses 221 on the ends of the three arms thereof and having a central hub 222 in which is a nut 223 secured thereto. Extending through the nut 223 is a screw shaft 224 on the left hand end of which is fastened a hand wheel 225. The spider 220 is removably secured to the tubes 128 by pins 243 passing through the bosses 221 and the tubes 128.

Referring now to the right hand side of Figure 18, a piston rod 240 is connected to a piston 245 in a cylinder 246 which is supported by spiders 247 and 248 having bosses 249 and 250 through which the tubes 128 pass. Longitudinal thrust is transferred from the cylinder 245 and 246 to the tubes 128 through pins 251 similar to the pins 243 and having the same function. The cylinder 246 has cylinder heads 252 and 253, and a pipe 254 connects to the left hand end of the cylinder 246 through the cylinder head 252, while a pipe 255 connects to the right hand end of the cylinder 246 through the head 253. If desired a gauge 256 may be provided conected to the right hand end of the cylinder 246 by means of a pipe 257. Each of the pipes 254 and 255 leads to a triple valve 260 having an operating handle 261, and a pipe 262 connects by way of a valve 263 to piping 264 leading to a source of air under pressure, steam under pressure, or the like. Triple valves being known, no cross section thereof is shown, but in one position of the handle 261 air is admitted to the right hand side of the piston 245 while the left hand end of the cylinder 246 is connected to an exhaust pipe 265 which simply exhausts into the air. In an opposite position of the valve handle 261 air or steam is directed to the left hand side of the piston 245, and the right hand side of the cylinder 246 is connected to the exhaust 265. In a third, which is a mid or neutral position of the handle 261, the flow of air or steam is shut off altogether by the valve 260, and both sides of the cylinder 246 are connected to exhaust 265, or the ports connecting to the pipes 254 and 255 may be blocked. By means of the handle 261 the piston 245 may be moved to the right or left, and when moved to the left it may be thrust in that direction with great force.

In the manufacture of molded pieces, without any binder, from various oxides, such as those mentioned, problems have been encountered which were not encountered in the molding of boron carbide, $B_4C$. One reason is the coefficient of expansion difference which is as in the following table.

TABLE

Coefficients of expansion, measurements being transverse to the molding axis. All figures $\times 10^{-6}$ per degree centigrade.

| Substance | Coefficient or Range thereof (all figures approximate) | Good as an Average over temperature Range Below in Degrees Centigrade |
|---|---|---|
| Graphite | 3.7 to 5.4 | 20–2,000 |
| Boron Carbide, $B_4C$ | 4.6 | 20–2,000 |
| Beryllia | 7.8 | 20–1,800 |
| Magnesia | 11.6 | 20–1,280 |
| Alumina | 6.3 | 20–1,750 |
| Thoria | 10.3 | 20–1,400 |
| Zirconia | 11 | 20–1,600 |

Thus boron carbide, $B_4C$, to mold which the above identified Ridgway furnace has chiefly been used, has a coefficient of expansion right in the same range as that of graphite, while the oxides listed (and probably others on which I have no good figures) have coefficients of expansion significantly higher than graphite.

The use of graphite cores in the molding of these oxides therefore seemed to be precluded, but graphite was and is the most practical material for cores as well as mold bodies on account of its refractoriness, non-reactivity at the temperatures involved, and its high strength at high temperatures.

Another problem encountered with the use of graphite cores in the manufacture of molded pieces especially of boron carbide is sticking of the material being molded to the core. However I know of no satisfactory substitute for graphite for the molds and cores in this type of hot pressure molding.

Referring now to Figure 1, I provide a mold body 20 which is a cylinder of graphite with a coaxial bore containing an undersized cylindrical mold core 22 also made of graphite. The mold body 20 and the core 22 are in this case of the same length. I provide two cylindrical sleeves 24 whose outside diameters are such that they fit with a sliding fit in the bore of the mold body 20, and whose inside diameters are such that they fit with a sliding fit on the core 22. These sleeves 24 are also made of graphite and in this case they are of the same length.

Referring now to Figures 12 and 13, the piston rod 240 of the Ridgway furnace has on the end thereof a plain ram head 25 and the screw shaft 224 of the Ridgway furnace has on the end thereof a similar ram head 25a. These ram heads 25 and 25a simply consist of plates 26 of steel integrally attached to hollow steel hubs 27 which fit with a loose fit on reduced end portions 28 and 29 of the piston rod 240 and screw shaft 224 respectively. The loose fit is so that strains will not be set up in the graphite plungers in case the end surfaces thereof are not exactly squared. The ram heads 25 and 25a can be picked off of the piston rod 240 and screw shaft 224 at any time that these are withdrawn.

Referring now to Figure 1, I provide graphite plungers 30, 31. These plungers are directly contacted by the ram heads 25 and 25a. These graphite plungers 30, 31 are cylindrical and they fit with a comfortably loose fit in the graphite heating tube 150 of the Ridgway furnace. They are of the same outside diameter as the mold 20 and they have axial bores which have the same diameter as the inside diameter of the sleeves 24. In the bore of the plunger 30 is a graphite rod 32 which has a diameter somewhat less than the bore in which it fits, so that there is substantial clearance. The length of the rod 32 is, in this case, the same as that of the plunger 30.

Before the mold 20 is placed in the graphite tube 150 of the Ridgway furnace, it is filled with material 34 in the form of a powder. This may be any of the carbide or nitride powders mentioned, or powder of any of the oxides mentioned, or mixtures of powders, or any other refractory powder which can be hot pressed to form an integral body. A satisfactory manner of filling the mold is, first to place the core 22 part way in a sleeve 24, then insert core and sleeve in the mold body 20 so that the ends of the core 22 are flush with the ends of the mold body 20, place the mold parts with their axes vertical, fill the space between the body 20 and the core 22 and insert the other sleeve 24. The assembly of mold 20, core 22, sleeves 24 and powder 34 is then taken to a hand press operating on the sleeves 24 to compact the powder as much as possible while it is cold, and the parts are adjusted so that each sleeve 24 extends to the same distance respectively both into and outside of the mold. Then the assembly is placed in the graphite tube 150 of the Ridgway furnace.

At some stage the plungers 30 and 31 are inserted in the furnace tube. The plunger 30 having the rod 32 should be at the "live" or piston rod end, while the plunger 31 having no rod therein should be at the "dead" or screw shaft end. Also the ram heads 25 and 25a are adjusted into contacts with the plungers, by turning the screw shaft 224 and manipulating the air valve 260 of the Ridgway furnace. The adjustments should be so made that there is continuous contact from ram head 25 to plunger 30, to sleeve 24 on one side of the mold, and from sleeve 24 on the other side to plunger 31 and ram head 25a, and the mold body 20 should be so located in the furnace tube that it will be at the center thereof at the peak of the operation. In connection with other embodiments of the invention to be described it should be understood that the molds may be filled and cold compacted in similar fashion and the plungers and rams may be adjusted in the furnace by the above or any equivalent procedure, the Ridgway furnace having many provisions for assembly and adjustment. It may be noted that in this and other embodiments of the invention, the graphite plungers extend well out of the furnace tube so that the power ram 25 on the piston 240 can move a substantial distance driving its plunger inwards, without contacting the furnace tube.

The Ridgway furnace is now ready to operate and is operated as described in the Ridgway patent. This involves heating of the furnace tube 150 of the patent by the flow of electric current therethrough, and the application at the same time of pressure by the ram head 25 on the plunger 30, the thrust against the mold being taken by the plunger 31 and the other or stationary ram head 25a. Since the mold 20 is free to move axially in the furnace tube both of the sleeves 24 are driven inwardly and compress the heated material 34 which sinters to form a solid sleeve of uniform structure and density close to the actual density of the material. In other words, the porosity of the article made from the material 34 will be low.

When, by the movement of the piston rod 240 and the time elapsed, the temperature reached and the pressure exerted, the operator knows that the heat may be turned off he performs the special step which is a particular feature of the present invention. This may be done without turning off the heating current, or so soon after turning off the heating current that the material 34 has not had a chance to cool much. The piston rod 240 is caused to retreat a considerable distance by means of the air valve 250 of the Ridgway furnace and then a short rod 36 of graphite (see Figure 2) having the same diameter as the rod 32 is placed against the rod 32 in the bore of the plunger 30, the ram head 25 of the piston rod 240 is now advanced to contact and then pressure is slowly applied. This forces the graphite core 22 right out of the hot material 34 and along the sleeve 24 part way into the bore in the plunger 31, as clearly shown in Figure 2. The heating current is now shut off or if it was already shut off, it is not again turned on. The pressure is not reapplied. The material 34 may now cool and shrink and will not be cracked by the core 22 having a lower coefficient of expansion nor will it stick to said core. Neither will it be cracked by the graphite rod 32 since the rod is undersized, that is of substantially smaller diameter than that of the core 22. The material 34 will not stick to the rod 32 because it is not in firm contact therewith.

When the furnace has cooled considerably, the plungers and mold assembly are removed from the furnace. The molded piece 34 is now taken out of the mold 20. In the case of some materials and some shapes the piece 34 comes free from the bore of the mold 20, while in other cases the mold 20 is cut off of the piece 34. The core 22 however is not in the piece 34 at all and the rod 32 readily slips out of it.

Referring now to Figures 3 and 4, another embodiment of the invention is disclosed for the molding of such materials as develop so much friction between themselves and a graphite core during heating that it is difficult to remove the core in one step as above described. In this embodiment there are a cylindrical mold body 20a, a core 22a, two cylindrical sleeves 24, and graphite plungers 30 and 31. All of these mold parts and the plungers are made of graphite. I further provide a graphite rod 32a which is relatively longer than the rod 32 and extends from the outer face of the plunger 30 to the core 22a. Consequently, during the sintering operation, while the heat and pressure are on and the material 34a is being compacted, the core 22a is gradually moved to the left arriving about at the position shown in Figure 4 when the material 34a has become fully compacted. With some materials this procedure prevents sticking which would otherwise occur, since adhesion forces do not have a chance to build up, being destroyed regularly. When the sintering under pressure is completed, the core 22a is still fully within the material 34a. The core 22a may now be removed by providing a short rod 33 (Figures 1 and 2) and proceeding as in the case of the first embodiment described, the core 22a going part way into the bore in the plunger 31. The remainder of the procedure is the same as first described and it is noted that the rod 32a should be undersized, that is of substantially less diameter than that of the core 22a.

Another advantage of this (second) embodiment of the invention is that the end of the rod 32a which finally enters the bore of the material 34a has been preheated to a greater extent than in the case of the other (first) embodiment of the invention, thus avoiding heat shocks to the material being molded, which heat shocks have in the case of some materials and some shapes caused cracks.

The above procedure and apparatus of this (second) embodiment is particularly useful for the oxides. However for the carbides the following (third) embodiment is preferred. Particularly boron carbide and titanium carbide develop so much adhesion to hot graphite in such a short time that for certain sizes and shapes intermittent moving of the core can not be successfully accomplished.

Referring now to Figures 5, 6 and 7, I provide a cylindrical mold body 20b of graphite having an axial bore, two sleeves 24b of graphite and graphite plungers similar to the plungers 30 and 31 of Figures 1 to 4. I further provide a thin hollow cylindrical graphite core 40 which fits with a sliding fit on a solid cylindrical graphite core 41. This mold is filled with molding material 34b which, in Figures 5 and 6 has been compacted. While the material 34b is still hot the solid graphite core 41 is pushed out of the thin hollow graphite core 40 by the same procedure as described in connection with Figures 1 to 4, using a rod 36. Figure 6 shows the solid core 41 removed. The core 40, or what remains of it, can be readily cut out of the piece 34b or sandblasted away. In either case it is an easy job compared with the removal of a solid core. Furthermore all danger of cracking the molded piece 34b is eliminated, since the thin core 40 will crack, crumble or deform if the piece 34b contracts faster than does the core 40.

Referring now to Figures 8, 9, 10 and 11, the method of the invention is therein illustrated in connection with multiple pressure molding. U. S. Letters Patent No. 2,150,884 to the same R. R. Ridgway shows multiple pressure molding in the aforesaid Ridgway furnace, in which graphite mold bodies with a plurality of bores are used in order to make a plurality of articles during each run of the furnace. I provide a mold body 45 of graphite having, as shown in Figure 10, a plurality of bores whose centers lie on a circle 47 which is coaxial with the mold body 45, the bores 46 being symmetrically spaced on the circle 47. I further provide a live furnace plunger 48 of graphite and a dead end furnace plunger 49 of graphite. These plungers 48 and 49 are preferably cylinders and they have bores 51 and 52, equal in number to the bores 46 and also symmetrically spaced on the (imaginary) circle 47 coaxial with the bodies. The plungers 48 and 49 and the mold body 45 can therefore be lined up in the furnace tube so that the bores 51, 46 and 52 will be in axial alignment.

I provide graphite mold cores 55, one for each of the bores 46 and of about the same length but of lesser diameter. I provide sleeves 56 of graphite which fit with a sliding fit on the cores 55 and in the bores 46, one for each end of each bore 46 which act as mold plungers like the sleeves 24 and 24b. I provide aligning pins 58 of graphite, one for each bore 52, each pin 58 having a portion 59 which fits the bore 52, and a portion 60 which fits inside the sleeve 56. I further provide push out plungers 61 made of graphite which fit with a loose fit in the bores 51. It will be noted that the bores 51 are of less diameter than the bores 52, and the bores 52 are of less diameter than the bores 46.

The mold body 45 is filled with material 62 which may be any of those mentioned or other material, and the mold plunger sleeves 56 are inserted. The dead end furnace plunger 49 is now aligned with the mold body 45 by placing a portion 59 of a pin 58 in each bore 52 and then inserting a portion 60 in each sleeve 56 at one end of the assembly. The live furnace plunger 48 is likewise aligned with the mold body 45 by inserting the push rods 61 part way into the sleeves 56. After the one plunger and the mold body 45 are aligned, the assembly may be pushed part way into the furnace tube and then the other alignment may be made and then the entire assembly may be centered in the tube and the rams 25 and 25a brought into position against the ends of the plungers 48 and 49. The furnace is now ready to operate.

Figure 8 shows a fragmentary view of one bore 46 of the mold body 45 showing the material 62 compacted at the peak of the furnace run, i. e. after the material 62 has been heated hot enough and long enough to effect, with the aid of the pressure used, the desired amount of sintering and compacting. The ram head 25 is now withdrawn and short graphite rods like the rods 36 are now inserted in the bores 51 and the ram head 25 is again advanced to push out the core rods 55. Or a continuous pushing and later ejection of the core rods 55 may be achieved by making the push out rods 61 of the proper length. Also in this multiple pressure molding the feature of using thin walled hollow cores backed up by solid cores may be used as was described in connection with Figures 5, 6 and 7. The cores 55 in any case eventually contact the pins 58 and further movement forces the pins 58 well into the bores 52 and finally the core rods 55 enter the bores 52 which have been aligned to receive thereby the core rods 55.

Referring now to Figures 14, 15 and 16, for the molding of crucibles or the like I provide a cylindrical graphite mold body 70 having an axial bore in one end of which is fitted a cylindrical graphite plunger 72 and in the other end of which is fitted a graphite plunger sleeve 73. Fitting with a sliding fit in the sleeve 73 is a thin walled graphite sleeve 74. A long graphite rod 75 is closely fitted to the inside of the thin walled sleeve 74 and a shoulder 76 thereof contacts the end of the sleeve 74. The outer end of the rod 75 is bored and threaded to form internal screw threads 77.

This mold of Figure 14 may be filled in the manner already described, that is to say the rod 75 is inserted in the sleeve 74, then the rod 75 and sleeve 74 are inserted in the sleeve 73 and then the sleeve 73 is inserted in the bore of the mold body 70, these parts then occupying the relative position shown in Figure 14. The material 80 to be molded is then poured into the space between the mold body 70 and the sleeve 74 and covering the end of the rod 75, whereupon the mold plunger 72 is inserted as shown and the assembly is taken to a hand press and the material 80 is cold compacted. At the dead end of the furnace I provide a solid graphite furnace plunger 81. The dead end plunger 81 is placed in the furnace tube 50 of the Ridgway furnace and is backed up by the head 25a on the screw shaft 224. I provide a live end furnace plunger 83 which has a bore 85. The plunger 83 is now placed over the rod 75 and in contact with the sleeve 73, and these parts and the mold 70 are now placed in the furnace tube 50 with the plunger 72 in contact with the plunger 81. It will be seen that the relative lengths of the rod 75 and plunger 83 are such that the former now projects beyond the latter at the right, Figure 14. I further provide a short graphite plunger 86 with a bore 87 which I place over the end of the rod 75 and in contact with the plunger 83. This plunger 86 extends beyond the rod 75.

Referring to Figure 17, in this embodiment of the invention I provide a ram head 90 which has a plate 91 integrally attached to a hub 92 with a tapered hole 93 therethrough and I provide a taper pin 94 passing through an oversized hole 95 in the piston rod 140a as well as through the tapered hole 93. I further provide a bore 96 in the plate 91 with a bayonet slot 97 therein.

The ram head 90 is now advanced into contact with the short graphite plunger 86 by manipulating the air valve 260 of the Ridgway furnace. The current is then turned on to heat the furnace tube 150 of the Ridgway furnace, and the air valve 260 is again turned to apply the pressure. Thus the sintering under pressure starts, and the cylindrical portion of the material 80 around the sleeve 74 is compressed and sintered first.

Although the ram 90 is the live ram and alone does the moving, and the ram 25a is adjustable but stationary during a heating cycle, force is exerted nearly uniformly on the two ends of the mold assembly since the latter is freely movable in the furnace tube 150 of the Ridgway furnace. However the force exerted by the sleeve 73 is over a much smaller area than the same force exerted by the plunger 72. Consequently, since the material 80 does not obey Pascal's law, there is greater pressure on the portion of the material around the thin sleeve 74. It is found that, after the material 80 has been heated up, the sleeve 73 will gradually move along the sleeve 74 to the left, but the plunger 72 will not come much, if any, nearer to the rod 75.

Accordingly, after the material 80 has reached its sintering temperature, the molding pressure having been applied during the heating, the mold assembly is in the condition illustrated by Figure 15. This shows the wall portion of the material 80 as having been compacted, while the portion which will form the bottom of the crucible has not been compacted. The ram head 90 is now caused to retreat and then the short graphite plunger 86 is picked off. Now the ram head 90 is again advanced and the full force is reapplied but this time it is exerted against the rod 75. Now a much greater pressure is developed in the material 80 which will form the bottom of the crucible and it is rather quickly compacted because the material is already at the sintering temperature. The plunger 72 appears to move further into the mold 70, but actually the rod 75, sleeve 74, sleeve 73 and mold 70 all move to the left while the plungers 72 and 81 remain stationary. Figure 16 shows the assembly at the end of the sintering and pressing with the crucible 80 fully compacted.

Before the crucible 80 has had a chance to contract by cooling, the rod 75 is removed from the sleeve 74. Referring now to Figure 17 I provide a metal screw 100 having threads which will fit the threaded bore 77. This screw 100 has a reduced end portion 101 with a bayonet lock 102 thereon. I now withdraw the ram head 90, quickly screw the screw 100 into the bore 77, advance the ram head 90 gently and enter the bayonet lock 102 in the bayonet slot 97, then turn the screw 100 to lock the parts together, then again cause the ram head 90 to retreat. This draws the rod 77 to the right and if the entire mold assembly starts to move I take a bar and thrust upon the plunger 83 to hold the mold assembly in the furnace tube 50. Thereby the rod 75 is withdrawn from the sleeve 74, and now the furnace can be allowed to cool with the mold assembly in the heating zone thereof.

In cooling the crucible can contract against the sleeve 74 which will crack or split. The remains of the sleeve 74 can be cut or sand blasted from the crucible after the other mold parts have been removed or cut away.

The reason why the rod 75 is not forced to the right during molding of the wall of the crucible (molding step Figure 14 to Figure 15) is that the pressure causes the sticky boron carbide to squeeze the thin sleeve 74 which grips the rod 75. However I find that the pressure should be raised slowly and do not cause the maximum pressure to be exerted against the material 80 of the wall, till the temperature has risen nearly to the maximum.

By proceeding in accordance with the invention as described in connection Figures 14 to 17 strong integral dense crucibles can be molded with few rejections. The method described is the best method now known to me for the manufacture of refractory oxide crucibles. For the manufacture of crucibles out of some of the oxides a solid one piece core rod may be used provided it is withdrawn before the material cools.

In all of the embodiments of the invention a pressure of twenty five hundred pounds per square inch against the material or part thereof is used as the highest pressure during the sintering operation. It is preferable to work up gradually to this top pressure. This has been found to be a satisfactory top pressure for all molding operations encountered. Higher or lower pressures could be used but calculations are simplified by using a standard pressure.

In the embodiment of Figures 14 to 17 inclusive, the complete core is the sleeve 74 and the rod 75. When the rod 75, which is the core rod, is removed, it can be said that the core has been moved or removed. At the same time a part of the core, the sleeve 74, remains, and the sleeve 74 is in one sense a core. In the embodiments of Figures 1 to 11 the cores 22, 22a, 41 and 55 are rods.

It will thus be seen that there has been provided by this invention a method of molding according to which the various objects hereinbefore set forth are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. Method of molding hollow bodies from refractory material comprising filling a mold cavity with a core and with the material to be molded, simultaneously heating and pressing until the material is sintered and compacted and then, before the material has had a chance to cool substantially, removing the core.

2. Method of molding hollow bodies from refractory material comprising filling a mold cavity with a core and the material to be molded, simultaneously heating and pressing and moving the core until the material is sintered and compacted and then, before the material has had a chance to cool substantially, removing the core.

3. Method of molding hollow bodies from refractory material comprising filling a mold cavity with a solid core on which is a thin hollow core and with the material to be molded, simultaneously heating and pressing until the material is sintered and compacted and then, before the material has had a chance to cool substantially, removing the solid core.

4. Method of making a crucible or other hollow body having a wall portion and a bottom portion out of refractory material comprising filling a mold cavity with a core and the material to be molded, simultaneously heating and pressing the wall portion until the material is sintered and compacted, then continuing the heating and pressing the bottom portion until the material is sintered and compacted and then, before the material has had a chance to cool substantially, removing the core.

5. Method of making a crucible or other hollow body having a wall portion and a bottom portion out of refractory material comprising filling a mold cavity with a solid core on which is a thin hollow core and with the material to be molded, simultaneously heating and pressing the wall portion until the material is sintered and compacted, then continuing the heating and pressing the bottom portion until the material is sintered and compacted and then, before the material has had a chance to cool substantially, removing the solid core.

GEORGE R. WATSON.

REFERENCES CITED

The following references are of record in the file of this patent:

UNITED STATES PATENTS

| Number | Name | Date |
| --- | --- | --- |
| 2,091,569 | Ridgway et al. | Aug. 31, 1937 |